United States Patent [19]

Hachisuka

[11] Patent Number: 4,766,801
[45] Date of Patent: Aug. 30, 1988

[54] HYDRAULICALLY OPERATED POWER STEERING SYSTEM

[75] Inventor: Hiroshi Hachisuka, Nishi, Japan
[73] Assignee: Aisin Seiki Co., Ltd., Kariya, Japan
[21] Appl. No.: 929,393
[22] Filed: Nov. 12, 1986
[30] Foreign Application Priority Data Nov. 13, 1985 [JP] Japan .................. 60-252813

[51] Int. Cl.$^4$ .............................................. F15B 9/10
[52] U.S. Cl. ........................................ 91/371; 91/372; 91/388; 91/434
[58] Field of Search .................. 91/370, 371, 372, 373, 91/379, 388, 433, 434, 451

[56] References Cited

U.S. PATENT DOCUMENTS

| 2,596,242 | 5/1952 | Hill .................................... 91/371 |
| 2,893,504 | 7/1959 | Jackson ........................... 91/371 X |
| 2,929,364 | 3/1960 | Gribler ............................... 91/371 |
| 3,602,101 | 12/1969 | Jablonsky et al. . |
| 3,719,124 | 3/1973 | Katz et al. . |
| 4,064,789 | 12/1977 | Bordovsky et al. ............. 91/371 X |
| 4,249,456 | 2/1981 | Luckel et al. . |
| 4,438,827 | 3/1984 | Lang . |
| 4,557,344 | 12/1985 | Lang .............................. 91/371 X |

FOREIGN PATENT DOCUMENTS

| 2211360 | 3/1972 | Fed. Rep. of Germany . |
| 2317089 | 4/1973 | Fed. Rep. of Germany . |
| 2327534 | 5/1973 | Fed. Rep. of Germany . |
| 585574 | 7/1981 | Japan . |
| 5876367 | 10/1981 | Japan . |
| 59-179455 | 3/1983 | Japan . |

Primary Examiner—Robert E. Garrett
Assistant Examiner—Mark A. Williamson
Attorney, Agent, or Firm—Burns, Doane, Swecker & Mathis

[57] ABSTRACT

There is disclosed a hydraulically operated power steering system which comprises a reciprocating-type hydraulically operated cylinder unit for moving a steering link mechanism and having first and second chambers, a reservoir containing hydraulic fluid therein, a hydraulic pump feeding the hydraulic fluid in the reservoir to the cylinder unit, a control valve unit including a line coupled to communicate the hydraulic pump, a line coupled to communicate the reservoir, a valve cylinder having passages coupled between the first and second chambers to provide fluid communication therebetween, and a valve spool slidably arranged in the valve cylinder and reciprocatingly movable in response to rotation of an input shaft, the cylinder unit including therein right and left reaction chambers to which opposite ends of the valve spool are exposed, the reaction chambers being communicated with the respective first and second hydraulic chambers through orifices, and a valve for dividing the left reaction chamber into a reaction chamber portion and a small chamber portion communicable with the second hydraulic chamber through an orifice, the valve being operable to direct hydraulic pressure to the line coupled to the reservoir when the hydraulic pressure exceeds a predetermined point.

4 Claims, 2 Drawing Sheets

HYDRAULICALLY OPERATED POWER STEERING SYSTEM

BACKGROUND OF THE INVENTION

1. Field of Invention

This invention relates to a hydraulically operated power steering system for use in automotive vehicles and more particularly to an improvement in a hydraulically operated reaction mechanism for use in a power steering system which comprises a reciprocating-type hydraulically operated cylinder unit for moving a steering linkage and having first and second chambers, a reservoir containing hydraulic fluid therein, a hydraulic pump feeding the hydraulic fluid in the reservoir to the cylinder unit, a control valve unit including a line coupled to communicate with the hydraulic pump, a line coupled to communicate with the reservoir, a valve cylinder having passages coupled between the first and second chambers to provide fluid communication therebetween, and a valve spool slidably arranged in the valve cylinder and reciprocatingly movable in response to rotation of an input shaft, wherein the hydraulic fluid from the hydraulic pump is introduced to the first hydraulic chamber upon rotation of the input shaft in one direction while the hydraulic fluid in the second hydraulic chamber is discharged to the reservoir, and wherein the hydraulic fluid from the hydraulic pump is introduced into the second hydraulic chamber upon rotation of the input shaft in the other direction while the hydraulic fluid in the first hydraulic chamber is discharged to the reservoir.

2. Description of the Prior Art

A conventional power steering system of this type is disclosed in Japanese patent publication No. Sho 49-1809. The disclosed system comprises a valve cylinder, a valve spool axially slidable relative thereto and having an axially extending bore, and two reaction pistons incorporated in the bore of the valve spool and non-shiftable relative to the valve cylinder. In such a system, hydraulic pressure is supplied in proportion to the application of steering force as shown in FIG. 5. When a car travels at a low speed, small steering force is required. However, if a steering force is lessened when the car travels at a low speed, such a steering force will become too small when the car travels at a high speed, whereby the maneuverability is deteriorated. In order to overcome this problem there has been proposed a system (greater hydraulic pressure is supplied upon the application of small steering force when the car travels at a low speed, whereas less hydraulic pressure is supplied upon the application of large steering force when the car travels at a high speed) wherein a variable orifice is provided to communicate reaction chambers with hydraulic chambers. With this arrangement, the characteristic curve is rendered variable, as shown in FIG. 6. However, this system is rather complicated and thus, costly.

SUMMARY OF THE INVENTION

It is, accordingly, a major object of the present invention to provide a simplified power steering system capable of providing heavy steering when a car travels at a high speed, and light steering when the car travels at a low speed.

In order to achieve the foregoing object, according to the invention, there is provided valve means designed to divide a left reaction chamber into a reaction chamber portion and a small chamber portion communicable with a first hydraulic chamber through an orifice. With this arrangement, as hydraulic pressure from a power steering pump exceeds a predetermined point, the valve means is rendered operable to release the hydraulic pressure to a passage coupled to communicate with a reservoir.

When a steering wheel is rotated to move a valve spool in one direction, hydraulic pressure from the power steering pump is introduced into a right reaction chamber, whereas return pressure is introduced into the left reaction chamber. Differential pressure between the chambers results in the production of reactive force. As the hydraulic pressure exceeds a predetermined point, the valve means is rendered operable to release the hydraulic pressure to the passage coupled to the reservoir. Accordingly, the reaction (steering) is smaller when a car travels at a low speed during which road surface resistance is large. Conversely, it is greater when the car travels at a high speed during which the road surface resistance is small. Thus, a simplified power steering system according to the invention provides two-phase steering, light steering when the car travels at a low speed and heavy steering when at a high speed.

Further objects, features and advantages of the present invention will become more clear upon a consideration of the following detailed description of a preferred embodiment when taken in conjunction with the accompanying drawings.

DESCRIPTION OF THE PREFERRED EMBODIMENT

Figure 1:
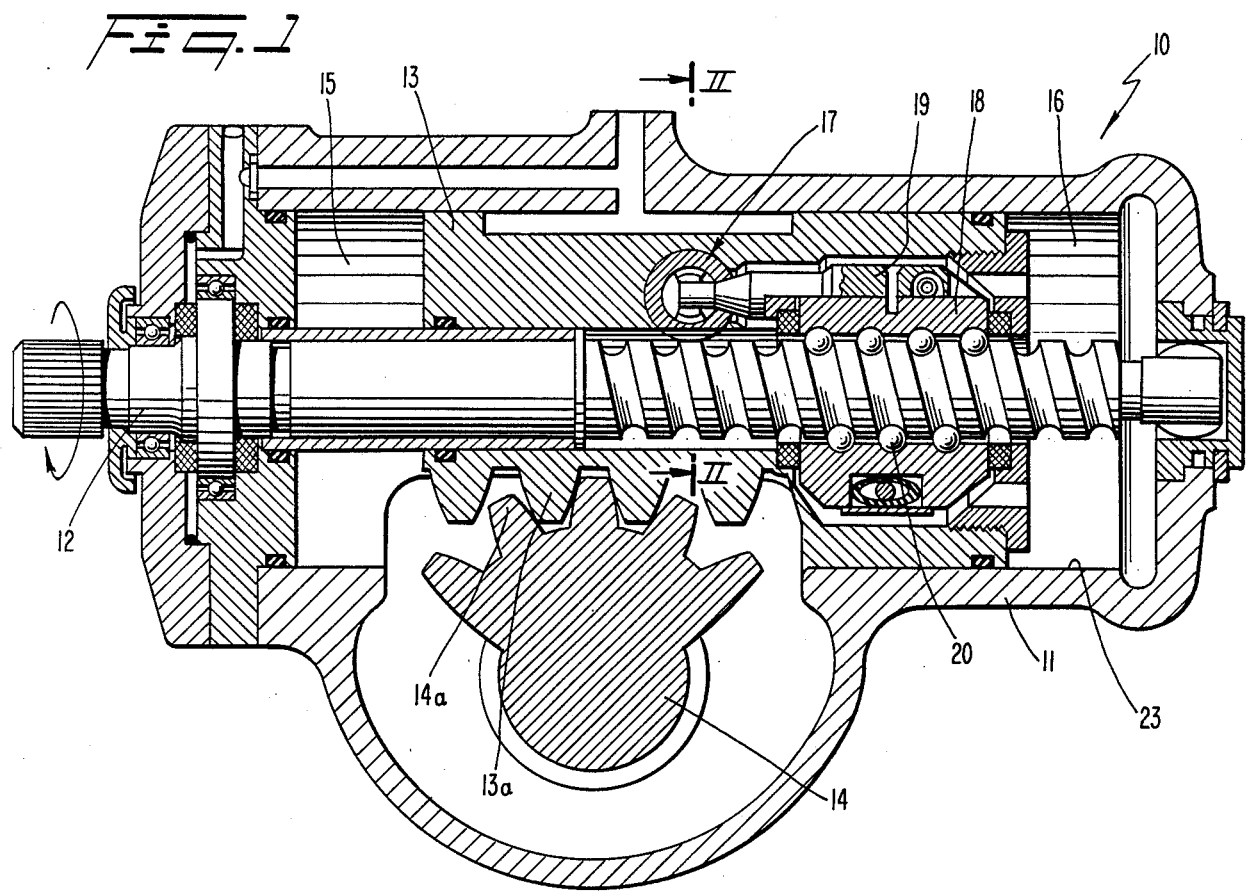
FIG. 1 is a transverse sectional view of a power steering system according to the present invention.
Figure 2:
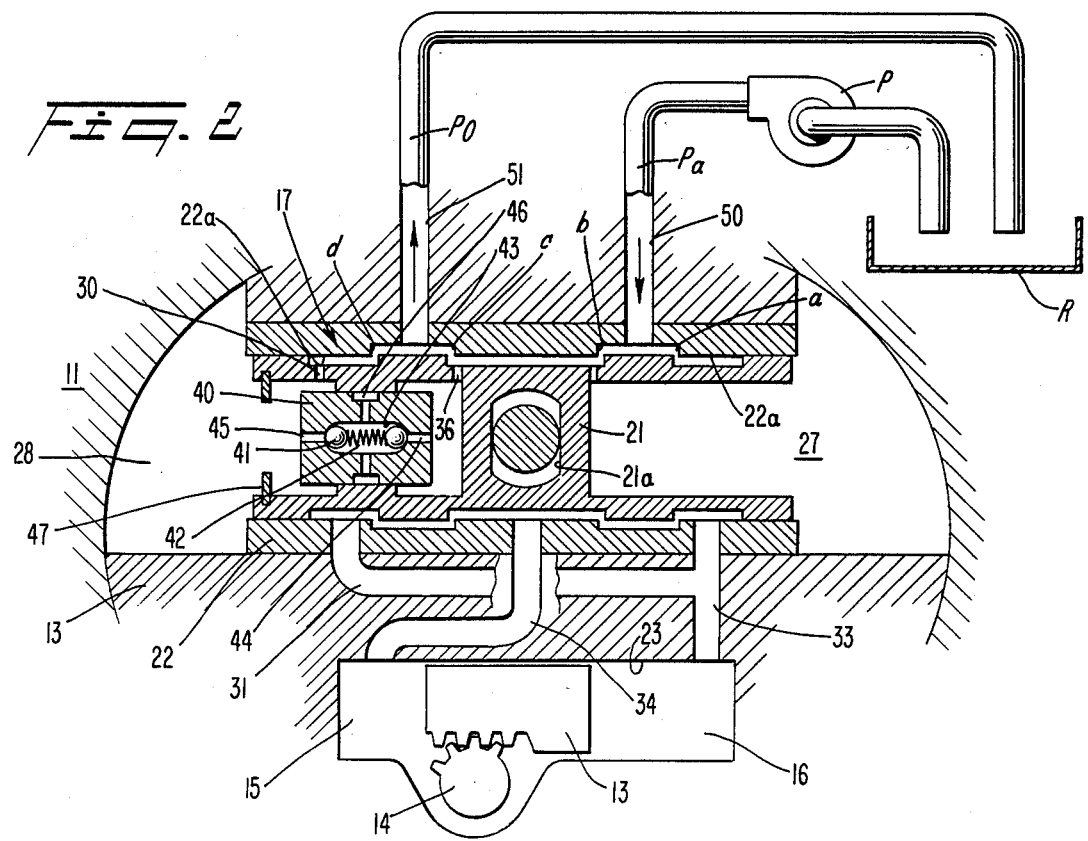
FIG. 2 is a longitudinal sectional view, on an enlarged scale taken along the line II—II of FIG. 1, showing the power steering system.

With now reference to FIGS. 1 and 2, there is illustrated a hydraulically operated power steering system 10 which includes a housing 11 attached to a vehicle frame or body, an input shaft 12 rotatably journaled in the housing 11, a piston 13 slidably fitted in the housing 11 in a water-tight manner and having an integral rack 13a thereon, and an output shaft 14 having a sector 14a for meshing engagement with the rack 13a of the piston 13. The input shaft 12 is connected to a steering wheel (not shown). The output shaft 14 is connected to a steering linkage (not shown). The housing 11 and the piston 13 constitute a reciprocating-type hydraulically operated cylinder unit in which a first hydraulic chamber 15 and a second chamber 16 are defined.

A control valve 17 is disposed in the piston 13 to introduce hydraulic fluid from a power steering, or oil pump P (operable by an engine) into the first hydraulic chamber 15 and discharge hydraulic fluid in the second hydraulic chamber 16 to a reservoir R. This control valve 17 is rendered operable by a nut member 18 and a valve pin 19 responsive to the rotation of the input shaft 12. The nut member 18 is threadably engaged with the input shaft 12 via balls 20. The nut member 18 is rotatable relative to the piston 13, but is unable to axially slide there along. Accordingly, upon rotation of the input shaft 12 the nut member 18 rotates therewith. The valve pin 19 is fixed to the nut member 18, the free end of which is fitted in a radial hole 21a of a valve spool 21 of the control valve 17.

In FIG. 2, the control valve 17 has a bushing 22 fitted in the lateral bore of the valve cylinder or piston 13. Formed within the bushing 22 is a cylinder portion 22a in which the valve spool 21 is slidably fitted. Throttle portions a, b, c, d are formed between the cylinder portion 22a and the valve spool 21. Right and left reaction chambers 27 and 28 are defined in the piston 13 rightwardly and leftwardly of the valve spool 21, respectively.

In its neutral position as shown in FIG. 2, the left reaction chamber 28 is in communication with the second hydraulic chamber 16 through an orifice 30 and passages 31, 33. Similarly, the right reaction chamber 27 is in communication with the first hydraulic chamber 15 through an orifice 32 and a passage 34.

The valve spool 21 includes a check valve 40 slidably fitted therein and adapted to divide the left reaction chamber 28 into a reaction chamber portion and a small chamber portion communicable with the first hydraulic chamber 15 through either an orifice 30 or an orifice 36. A valve bore 43 is formed in the check valve 40 to receive balls 41 and springs 42 urging the balls 41. The check valve 40 has orifices 44, 45 at its right and left ends and a port 46 on its periphery. A stopper 47 is provided at the left end of the valve spool 21 to prevent movement of the check valve 40.

In operation, as a steering wheel (not shown) is rotated to move the valve spool 21 to the right, hydraulic pressure Pa supplied from the oil pump P through a feed line 50 is introduced to the right reaction chamber 27 through the orifice 32. On the other hand, a return pressure Po is provided in the left reaction chamber 28 as the left reaction chamber 28 is in communication with a return line 51 through the orifice 30. Thus, leftward reaction S (Pa-Po) is produced, wherein S is the area of the valve spool on which the pressure is applied. At this time, the hydraulic pressure Pa is introduced through the passage 34 into the first hydraulic chamber 15, on the one hand and the return pressure Po is introduced through the passages 31, 33 into the second hydraulic chamber 16, on the other hand. Accordingly, the piston 13 is moved in the same direction as the control valve 12 in the figures of the drawing.

Figure 3:
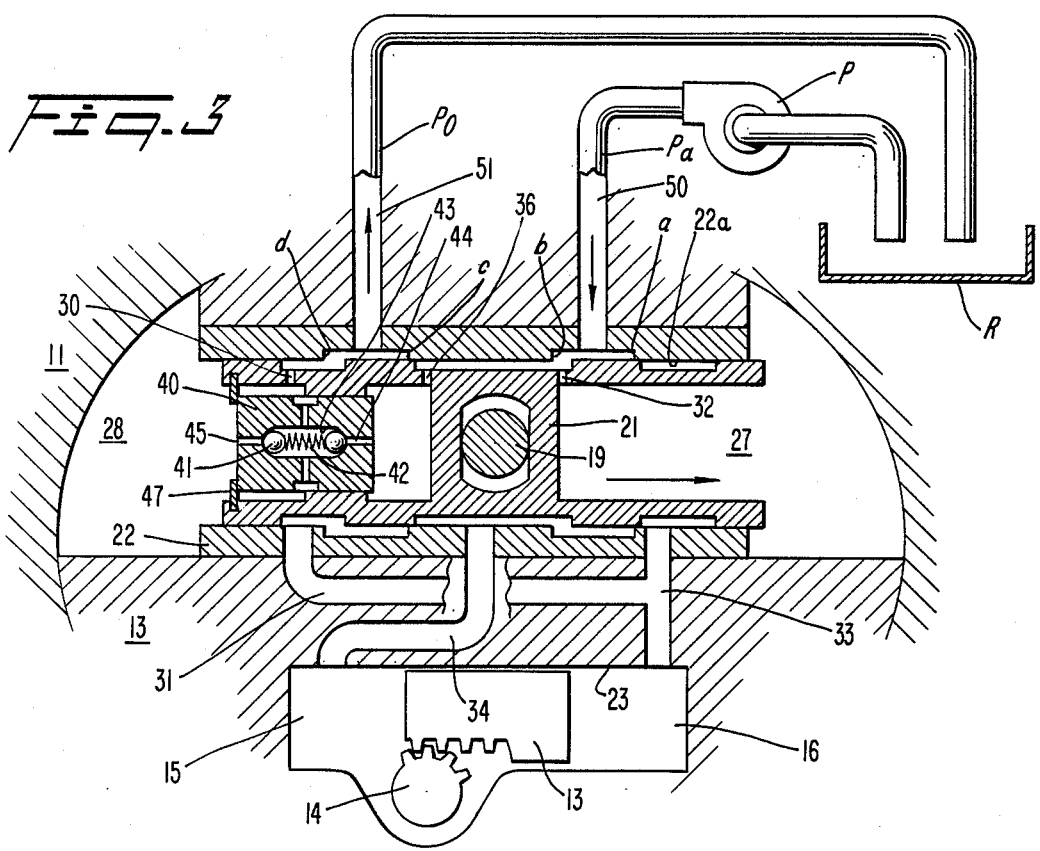
FIG. 3 is a sectional view showing a valve spool moved to the right.

Such reaction is obtainable when road surface resistance is small. However, as the road surface resistance is greater, the hydraulic pressure Pa is introduced through the orifice 36 into the small chamber to move the check valve 40 to the left. As a result, the check valve 40 is urged against the stopper 47 as shown in FIG. 3. Under a predetermined pressure, the ball 41 is separated from a valve seat and the hydraulic pressure Pa is released to the return line 51 through the orifice 36, orifice 44, port 46 and orifice 30.

Figure 4:
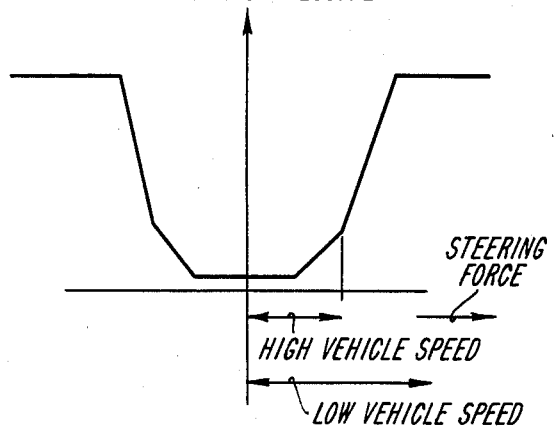
FIG. 4 is a graph showing steering force in relation to road surface resistance (hydraulic pressure as supplied) in the power steering system according to the present invention.
Figure 5:
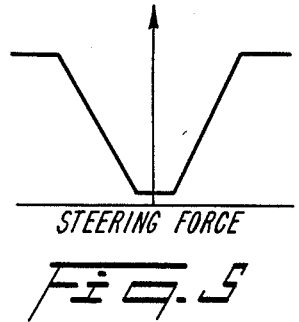
FIG. 5 is a graph showing steering force in relation to hydraulic pressure in a conventional power steering system.
Figure 6:
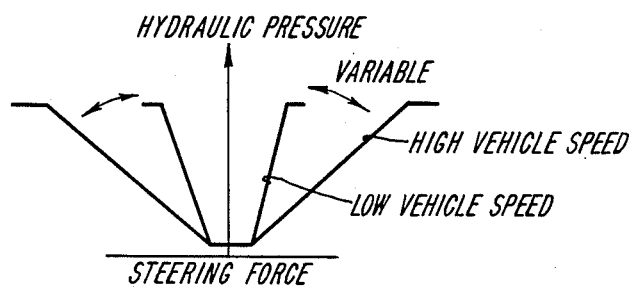
FIG. 6 is a graph showing steering force in relation to hydraulic pressure variable in response to vehicle speed under electronic control.

At this time, the reaction S is represented by $$S(Pa-Po)/(A_2/A_1)^2+1$$

wherein $A_2$ is the effective cross section of the orifice 44, $A_1$ is the effective cross section of the orifice 30. This is a relatively small reaction which prevents heavy steering when the car travels at a low speed or at rest. FIG. 4 is a graph showing the hydraulic pressure in relation to vehicle speed and road surface resistance.

When the valve spool 21 is moved to the left, the hydraulic pressure Pa is introduced through the passages 31, 33 and the orifice 30 into the left reaction chamber 28, whereas the return pressure Po is provided in the right reaction chamber 27 through the orifice 32. Thus, rightward reaction of the same value as the reaction above is obtained. As the pressure Pa increases, the check valve 40 is moved to the right. Further, as the hydraulic pressure Pa exceeds a predetermined point, the check valve 40 is urged against the inner end of the valve spool 21. As a result, the ball valve 41 is opened and the hydraulic pressure Pa is directed to the return line 51 through the orifice 45, valve bore 43, port 46 and orifice 36. Thus, reaction will be less at low vehicle speeds.

Various modifications of the preferred embodiment of the invention will be apparent to those skilled in the art. It is to be understood, therefore, that such modifications can be made without departing from the scope of the invention, if they are within the spirit and the tenor of the appended claims.

What is claimed is:

1. A hydraulically operated power steering system comprising:
    a reciprocating-type hydraulically operated cylinder unit for moving a steering link mechanism and having first and second hydraulic chambers,
    a reservoir containing hydraulic fluid therein,
    a hydraulic pump feeding said hydraulic fluid in said reservoir to said cylinder unit,
    a control valve unit including a line coupled to communicate with said hydraulic pump, a line coupled to communicate with said reservoir, a valve cylinder having passages coupled between said first and second chambers to provide fluid communication therebetween, and a valve spool slidably arranged in said valve cylinder and reciprocatingly movable in response to rotation of an input shaft, wherein the hydraulic fluid from said hydraulic pump is introduced into said first hydraulic chamber upon rotation of said input shaft in one direction while said hydraulic fluid in said second hydraulic chamber is discharged to said reservoir, and wherein said hydraulic fluid from said hydraulic pump is introduced into said second hydraulic chamber upon rotation of said input shaft in the other direction while said hydraulic fluid in said first hydraulic chamber is discharged to said reservoir, said valve cylinder including therein right and left reaction chambers to which opposite ends of said valve spool are exposed, said reaction chambers being in communication with the respective first and second hydraulic chambers through orifices, and valve means for dividing said left reaction chamber into a reaction chamber portion and a small chamber portion communicable with said second hydraulic chamber through an orifice, said valve means being a check valve slidably fitted in said valve spool in said left reaction chamber and being operable to allow fluid communication between said reaction chamber portion and said line coupled to said resrvoir when hydraulic pressure in said reaction chamber portion exceeds a predetermined point as well as fluid communication between said small chamber portin and said line coupled to said reservoir when hydraulic pressure in said small chamber portion exceeds a predetermined point.

2. A hydraulically operated power steering system as claimed in claim 1, further including orifices for throttling said fluid communication between said reaction chamber portion and said line coupled to said reservoir as well as fluid communication between said small chamber portion and said line coupled to said reservoir.

3. A hydraulically operated power steering system as claimed in claim 1, wherein said valve spool includes a stopper at its one end adjacent said left reaction chamber so as to prevent movement of said valve means.

4. A hydraulically operated power steering system as claimed in claim 1, wherein said check valve comprises two balls and a spring disposed therebetween.

* * * * *